O. H. AMES.
AUTOMOBILE JACK TRUCK.
APPLICATION FILED FEB. 2, 1911.
1,014,991.
Patented Jan. 16, 1912.
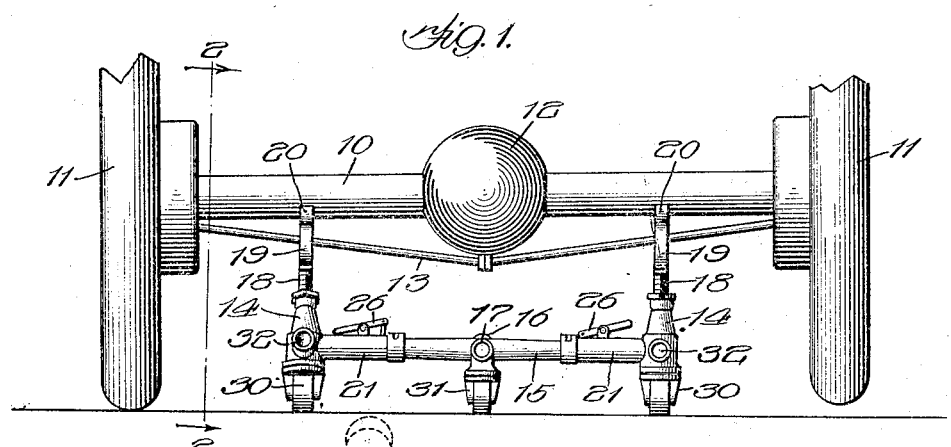
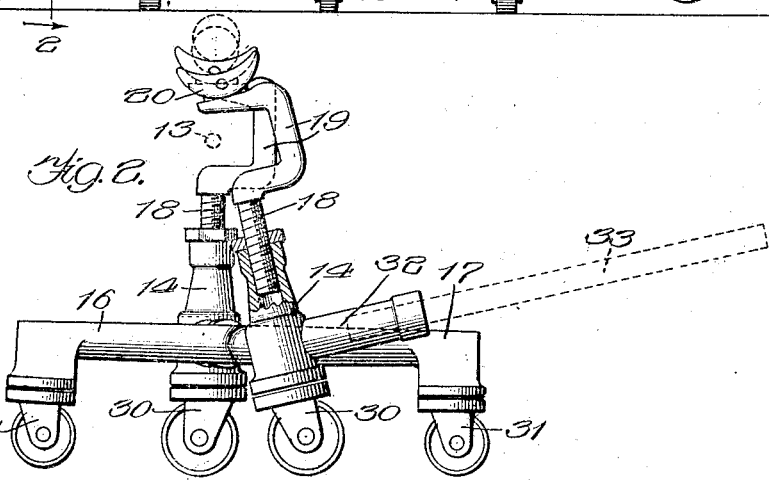
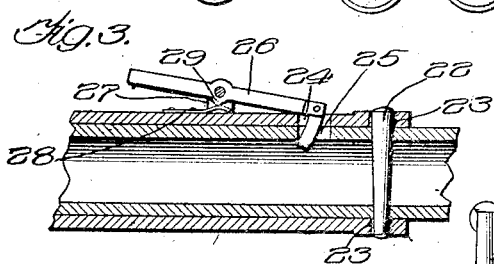
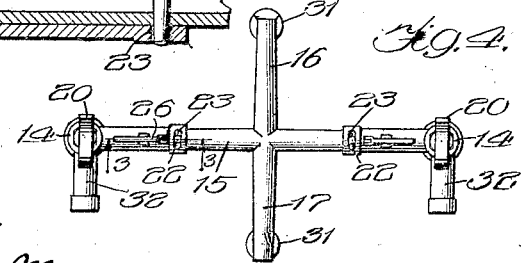

UNITED STATES PATENT OFFICE.

OSCAR H. AMES, OF COAL HILL, PENNSYLVANIA, ASSIGNOR OF ONE-HALF TO ROBERT McCALMONT, OF FRANKLIN, PENNSYLVANIA.

AUTOMOBILE JACK-TRUCK.

1,014,991.  Specification of Letters Patent. Patented Jan. 16, 1912.

Application filed February 2, 1911. Serial No. 606,192.

*To all whom it may concern:*

Be it known that I, OSCAR H. AMES, a citizen of the United States, residing at Coal Hill, in the county of Venango and State of Pennsylvania, have invented certain new and useful Improvements in Automobile Jack-Trucks, of which the following is a specification.

My invention relates to automobile jack trucks, and the invention has for its object to provide certain novel and improved constructions in devices of this sort to be hereinafter described and claimed.

A primary and specific object of the invention is to provide an improvement upon the form of jack truck disclosed in my application for patent Serial No. 550,618, filed March 21, 1910, the improvement consisting in the provision of the jack truck with means for, under all conditions, effectually preventing the device from dumping its load. It has been found that under certain conditions, for example, when the surface over which the automobile is wheeled is rough, the support afforded by the jack truck, when constructed in accordance with the above mentioned application, is likely to be unstable.

The improvement constituting the present invention is shown in a preferred embodiment, in the accompanying drawings, wherein—

Figure 1 is an elevation of the jack truck shown in position under the rear axle of an automobile; Fig. 2, a sectional elevation taken on line 2—2 of Fig. 1, looking in the direction of the arrows; Fig. 3, a fragmentary section illustrating a preferred form of lock for the rocking standards, and Fig. 4, a plan view of the jack truck.

Like characters of reference indicate like parts in the several figures of the drawings.

Referring to the drawings, 10 designates the rear axle of an automobile, 11, 11 the wheels, 12 the gear case, and 13 the truss rods, these parts being shown in a diagrammatic manner.

The jack truck, in the preferred form shown, comprises two standards 14, a cross piece 15 with which the standards are pivotally connected, and the forwardly and rearwardly extending longitudinal sustaining members designated 16 and 17, respectively. The standards 14 are formed with threaded sockets which receive the threaded ends of the axle supporting members 18 formed preferably with the offset portions 19 to avoid truss rods 13, and provided preferably with the rocking pillows 20. Standards 14 are also formed with the horizontally extending sockets 21 which receive the ends of the cross piece 15. At each end of the cross piece there is a pin driven into the cross piece with its ends extending into arcuate slots 23 in the sockets permitting rotation of the sockets with respect to the cross piece while preventing endwise movement. Socket and cross piece are formed with the perforations 24 and 25 which come to register when the standard is in its operative or elevating position. An angular locking dog 26 pivoted in a fork 27 is arranged so as to enter the perforations 24, 25 and thus lock the standard in this position. A flat spring 28, the end of which is bowed as shown (Fig. 3) bears against a lug 29 on the under side of the locking dog with the result that the dog is held either in its locking or its inoperative position, as may be desired. The standards 14 are provided at their lower ends with rollers, preferably with the casters 30. The longitudinal sustaining members 16, 17 are rigid with the cross piece 15 and are preferably provided with the casters 31. Preferably the arrangement of the parts is such that the caster on member 16 is raised a trifle from the ground. Standards 14 are formed with the sockets 32 adapted to receive the end of the removable operating lever 33.

The operation of the device as above described is as follows: The jack truck is placed under the axle of the automobile with the standards in their inclined position, that is, with both standards in the position of the right hand standard of Fig. 2, the left hand standard of Fig. 1. The standards are separately rocked to the upright position, that is, to the position of the left hand standard in Fig. 2, the right hand standard in Fig. 1, by means of the lever 33. When the standards have been thus rocked to their elevating or operative positions the dogs 26 are moved so as to enter the perforations 24, 25 in the sockets 21 and cross piece. This locks the standards in the upright position. In the construction of jack truck shown, the load is normally supported on the casters 30 of the standards and the caster 31 of the rear sustaining member 17. It will be understood that the forward axle of the automobile will be similarly supported by a device of similar construction to the one just described. When so supported the automobile may be pushed from place to place in the garage without danger of displacing the jack trucks. If the movement of the automobile causes either truck to tilt from its normal position the caster wheel on sustaining member 16 will be brought into contact with the ground. It will be understood that the only reason for having this caster normally out of contact with the ground is to increase the facility with which the automobile may be moved from place to place. A three wheel support will move more easily than a four wheel support.

I claim:

An automobile jack truck comprising in combination a cross piece, two standards pivotally mounted on the cross piece and provided at their upper ends with axle supporting devices and at their lower ends with rollers, means on the standards adapted to be engaged by a lever for rocking the standards separately into position to elevate the ends of the axle, locking devices for locking the standards to the cross piece, longitudinal sustaining members rigidly connected with and extending from the cross piece on opposite sides thereof and rollers on the outer ends of the said sustaining members adapted to bear upon the ground so as to prevent the truck from tilting and dumping its load.

OSCAR H. AMES.

Witnesses:
   Jos. W. Barr,
   Helen R. Steuart.